June 19, 1956 A. COLONNA 2,750,870
URN WITH READILY INSERTABLE AND REMOVABLE COFFEE VESSEL
Filed Dec. 24, 1953

Angelo Colonna
INVENTOR.

BY *Clarence A. O'Brien*
*and Harvey B. Jacobson*
Attorneys

United States Patent Office 2,750,870
Patented June 19, 1956

2,750,870

URN WITH READILY INSERTABLE AND REMOVABLE COFFEE VESSEL

Angelo Colonna, Philadelphia, Pa.

Application December 24, 1953, Serial No. 400,229

3 Claims. (Cl. 99—279)

The present invention relates to an improved coffee urn which is thought to be a unique and desirable contribution to the urn art in that it is characterized by a readily insertable and removable coffee making, containing and dispensing vessel which, because of the practical and easy removal step promotes greater cleanliness, sanitation, and, which is just as important, permits the making of a more tasty and better cup of coffee.

The ordinary or so-called conventional-type coffee urn, the single vessel type, for example, is characterized, as is well known, by a water containing and heating boiler made up of a cylindrical or equivalent outer casing having a bottom, a vertical wall portion, and which contains within its limits a depending receiver, sometimes called an air cell, but which is in effect the inner wall of the stated boiler, the walls of the respective parts being spaced to provide a water containing space having suitable water supply means and an appropriate source of heat, such as gas, steam, or electricity. In addition to other external pipes and parts, which need not be mentioned, the service spigot or faucet is joined by drain pipe means which latter is connected with the bottom of a coffee making vessel, jar or the like which is telescopically fited in spaced relation within the confines of the stated receiver. The bottom of this vessel is connected to a fitting which is known in the trade as a bottom connection with a two-piece flange connection with a gasket making the urn water-tight. This is not a permanent installation and it therefore causes trouble through leaks and further the gasket must be renewed from time to time and what is more noticeable, the construction is not sanitary, especially in those constructions where no provision is made for removing the vessel and drain pipe or pipes for periodical scouring and cleaning.

The present invention has to do with several improvements. First, the coffee making vessel is easy to dismantle, that is it can be placed in position or removed whenever it is desired with expediency and without hindrance. Secondly, the drain tube or pipe which dispenses the made coffee from the bottom of the vessel and delievers it through the take-off or service faucet, instead of having coupled connection with the bottom of the vessel is made integral, insuring a sanitary leak-proof permanent arrangement.

Then, too, novelty is predicated on housing or shielding the drain tube where it is coupled to the faucet by isolating the tube and keeping it out of direct contact with the water in the chamber of the stated boiler or jacket construction.

More explicitly, the side of the receptacle cooperating with the service faucet is provided with a slot through and beyond which the integral drain tube is extended and said slot has an associated outstanding or radial box-like shield which provides clearance for the drain pipe and facilitates the steps of removing the vessel and drain pipe, as a unit, for cleaning and then placing it back in position and guiding the drain tube or pipe into connectible relationship with the faucet and aperture means provided therefor in the casing wall and adjacent wall of the shield.

Finally, novelty is thought to reside in the coffee-making vessel per se, especially one whose lower end is provided with the integral leak-proof drain-off tube and whose upper end is fashioned to include an appropriate endless ledge or flange and an associated portion for supporting an insertable and removable leacher.

Other objects, features and advantages will become more readily apparent from the following description and the accompanying sheet of drawings.

Figure 3:
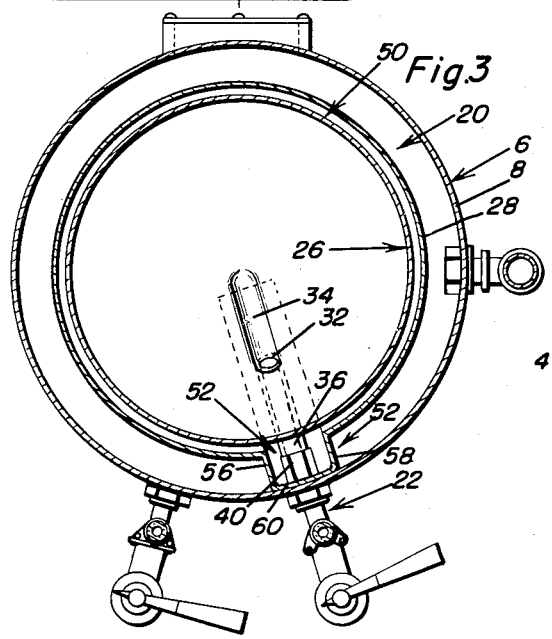
Figure 3 is a horizontal section on the line 3—3 of Figure 2 looking in the direction of the arrows.
Figure 4:
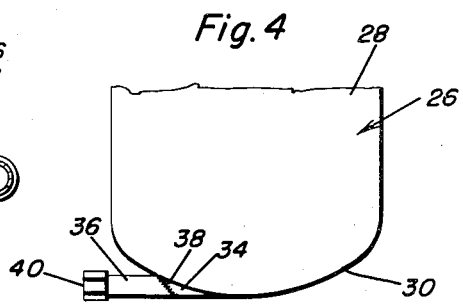
Figure 4 is a fragmentary elevational view of the bottom portion of the insertable and removable coffee making and containing vessel.

Referring now to the drawings with the aid of reference numerals and lead lines, the urn herein disclosed is somewhat conventional in exterior appearance. Considering the brief summarization which has already been given above it is thought that it is not necessary to go into great detail concerning the construction of a coffee urn. Some of these urns comprise a single unit, as revealed in the drawings of this case, and others include double units (not shown). As a matter of fact they are sometimes referred to in the trade as duplex urns and triplex urns and so on. For sake of informative illustration of the instant invention the simplest construction is shown. Also, sufficient of the external pipes and other details are here illustrated but are not involved in the essence of the invention. Insofar as this invention is concerned all that is necessary to point out is that the boiler or water jacket is characterized by what may be called and outer wall or casing 6 which is here shown as generally cylindrical and which has a vertical wall portion 8, an elevated bottom 10 (see Figure 2) and a depending supporting skirt or base portion 12. Depending through the upper open end of the outer casing is a complemental part, sometimes referred to as an air cell, and is generally denoted here in Figures 2 and 3 by the numeral 14. This is a suitable receiver having a cylindrical wall portion 16 and a bottom 18, Figure 2, spaced above the bottom 10. In fact, the wall of the receiver is spaced from the wall of the casing to provide a water containing and heating space or chamber 20. These is an appropriate opening or orifice in the wall 8 above the bottom to accommodate a service spigot or faucet 22 through which the coffee is drawn off for use in a well known manner. This faucet has a screw-threaded coupling or neck at 24 which serves in a manner to be described. The receiver 14 is different from others in the art in that it is especially constructed to accommodate the readily insertable and removable coffee making sanitary-type vessel 26. It may be stated in this connection that this "vessel" is sometimes referred to by others in the art as a liner, as a coffee jar, container and so on. It is believed, however, that the expression "vessel" is aptly descriptive of this part inasmuch as the matter of material, size and shape is of no importance here, the important thing being that the vessel must be readily insertable and removable for cleaning, scouring and health-promoting purposes. In any event, the vessel is made so that it depends into the receiver 16 in spaced relation. It has a main cylindrical wall portion 28 and an appropriately rounded or concavo-convex bottom 30. The bottom is provided to one side with a discharge or outlet opening 32 and a trough-like feeder 34, this arrangement serving to accommodate the integral laterally or radially disposed drain tube 36. Usually, that is in the trade and the prior art, the so-called drain tube is separably coupled to the bottom of the vessel but here it is welded and therefore an integral part. In particular the welded joint is denoted at 38 in Figure 4. An appropriate fitting 40 on the end of the drain tube serves to accommodate the threaded neck 24 making the delivery connection between the faucet and tube substantially leak-proof and satisfactory.

Figure 1:
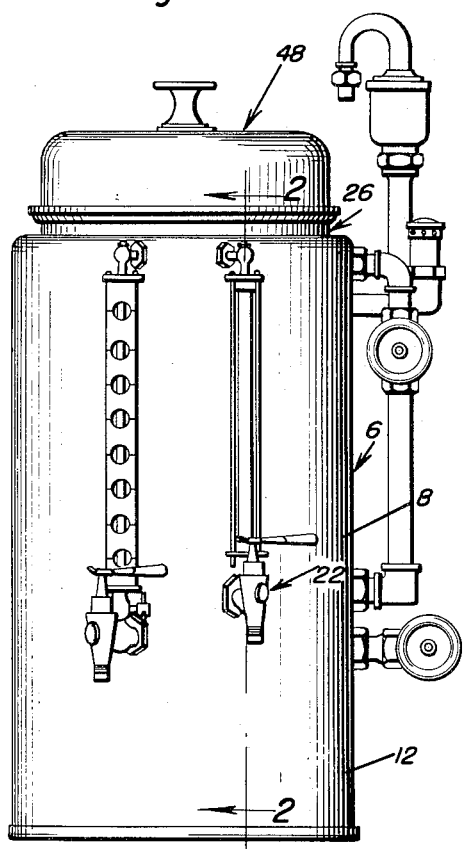
Figure 1 is a front elevation of a coffee urn constructed in accordance with the principles of the present invention.
Figure 2:
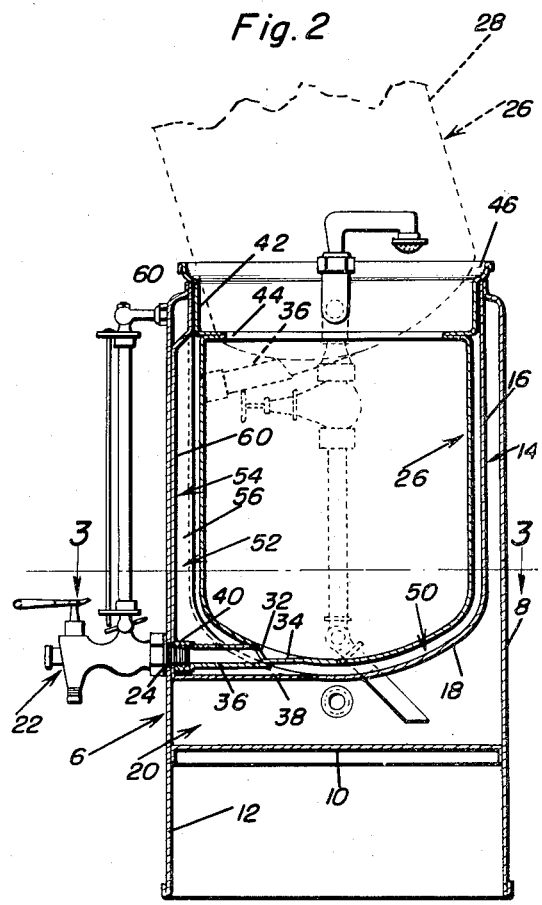
Figure 2 is a section on the line 2—2 of Figure 1 looking in the direction of the arrows and with parts appearing in elevation.

As brought out in Figure 2 the upper annular portion 42 joins the body or wall portion 28 by way of an appropriately bent endless flange 44 which constitutes a seating ledge for an insertable and removable leacher structure (not shown). The extreme upper end is fashioned into an outstanding endless lip 46 constituting a satisfactory seat for the applicable and removable lid or cover 48 (see Fig. 1). The vessel 26 is readily insertable and removable as shown in phantom and dotted lines in Figure 2. The permanent connection between the drain tube 36 and the drainage means 32 and 34 at the bottom is highly important and is, it is believed, a definite improvement in the art. Inasmuch as the unit 26 is fitted in spaced relation to provide an air space, as at 50, between itself and the receiver 14 and to maintain the usual spaced relation clearance for the projecting drain tube 36 special accommodation therefor is necessary in the wall portion 16 of the receiver. This is accomplished by providing a vertical or lengthwise slot 52 (see Figs. 2 and 3) and this ranges from near the top to the bottom of the receiver and allows the tube 36 to be lined up therewith as shown in dotted lines and then guided and delivered to the bottom of the assembly for connection of the parts 22, 24 and 36. So that the tube will be shielded and isolated it not only extends through the slot 52 but has clearance movement up and down in the outstanding box-like shield, which is here generally denoted by the numeral 54. This is a simple channel-shaped member which is commensurate in length with the slot and which has wall portions 56, 58 and 60 providing a substantially imperforate enclosure for the tube 36. This slotted and shielded arrangement makes for ready insertion and removal of the tube-equipped vessel 26. It follows that the invention involves an urn which is greatly improved because of the details disclosed and which is characterized therefore by the coffee making jar or vessel with the permanent drain tube and the especially constructed water jacket, all assembled in the simplified manner disclosed in the drawings and eliminating separable and screwed connections such as are unsanitary and troublesome.

Although the preferred embodiment of the invention is disclosed in the drawings it will be understood that changes in shape, size, materials and rearrangement of details and parts may be resorted to in actual manufacturing and other required practices and it is intended that the subjoined claims be construed accordingly.

What is claimed as new is as follows:

1. A coffee urn comprising, in combination, a heated water boiler embodying spaced inner and outer integrated walls defining a water containing and heating chamber between themselves, said inner wall having a bottom and being fashioned into an open-top receiver, a readily insertable and removable complemental coffee making and containing vessel fitting removably within the confines of said receiver, said vessel being provided at its bottom with a sump and an aligned coffee outlet, a drain tube integrated at one end with said bottom and in communication with said outlet, and a service faucet arranged exteriorly of said outer wall and separably and communicatively coupled to the other end of said drain tube by way of an opening in said outer wall, whereby when said faucet is uncoupled from said drain tube, the latter and said vessel, as a unit, may be bodily lifted and thus removed from said receiver for scouring and cleaning before being replaced in said receiver, said receiver having a vertical slot in one side ranging from the bottom to a point adjacent to the top of the receiver, said one side also having an elongated box-like shield projecting radially and registering with said slot, said shield being essentially imperforate and channel-shaped in cross-section and providing a clearance and guiding channel for the accommodation of and insertion and removal of said drain tube, the bottom portion only of one wall of said shield having an opening in alignment with the stated faucet opening in said outer wall.

2. An urn comprising, in combination, a heated water containing boiler embodying an outer casing closed at the bottom and open at the top, a receiver depending into said casing with its bottom and main wall portion spaced from the encompassing bottom and wall portions of said casing, said receiver being open at the top and joined with the complemental open top portion of said casing and providing a water-tight water containing and heating chamber, said receiver being adapted to accommodate a complemental insertable and removable coffee making and container vessel and having a vertical slot in one side extending from the center of the bottom to a point adjacent to but spaced downwardly from the top of the receiver, said one side also having an integral elongated box-like shield aligned with the slot and projecting radially beyond the exterior surfaces of the receiver and registering with and commensurate in length with said slot, said shield having a basal portion which is generally coplanar with the slotted bottom of the receiver and being closed at its upper and lower ends and channel-shaped in cross-section and providing an accommodation and guiding channel, and a sanitary-type readily insertable and removable coffee making, containing and dispensing vessel, said vessel being open at the top and having a radially disposed drain tube formed integrally with its bottom, and said open top portion being fashioned into a holder for an insertable and removable leacher and having a supporting flange for said leacher, said vessel fitting telescopically into and being substantially confined in said receiver and said drain tube being normally housed in said basal portion of the shield in a position to provide for the attachment thereto of a readily attachable and detachable faucet.

3. A coffee urn comprising, in combination, a heated water containing boiler embodying an outer casing closed at the bottom and open at the top, a receiver depending into said casing with its bottom and main wall portions spaced from the encompassing bottom and wall portions of said casing, said receiver being open at the top and joined with the complemental open top portion of said casing and providing a water-tight water containing and heating chamber, said receiver being adapted to accommodate a complemental insertable and removable coffee making and containing vessel and having a vertical slot in one side extending from the center of the bottom radially and then vertically to a point adjacent to but spaced downwardly from the top of the receiver, said one side also having an integral elongated box-like shield aligned with the slot and projecting radially beyond the exterior surfaces of the receiver and registering with and being commensurate in length with said slot, said shield having a basal portion which is generally coplanar with the slotted bottom of the receiver and which constitutes a housing for a complemental drain tube, said shield being closed at its upper and lower ends and otherwise substantially imperforate and provided adjacent said basal portion with a hole for a faucet lined up with the complemental opening in a cooperating portion of the wall of said outer casing, said shield being channel-shaped in cross-section and providing an accommodation and guiding channel, and a readily insertable and removable sanitary-type coffee making, containing and dispensing vessel open at its top and provided at its bottom with a discharge opening and an aligned sump and having a radially disposed drain tube in a plane with the bottom of the vessel and integrated at one end with said sump and aligned with said discharge opening and provided at its other end with a screw-threaded relatively fixed fitting, said vessel fitting telescopically into and being substantially confined within the limits of said receiver and said drain tube being normally housed in said basal portion and said fitting being in alignment with the faucet hole, said faucet having a screw-threaded neck passing through said facuet hole and being separably coupled to the screw-threaded fitting.

References Cited in the file of this patent
UNITED STATES PATENTS

| | | |
|---|---|---|
| 1,572,221 | Petersen | Feb. 9, 1926 |
| 2,076,881 | Cunningham | Apr. 13, 1937 |
| 2,096,848 | Felix | Oct. 26, 1937 |
| 2,291,256 | Rehrig et al. | July 28, 1942 |